(12) United States Patent
Hall et al.

(10) Patent No.: US 8,616,783 B2
(45) Date of Patent: Dec. 31, 2013

(54) FIBER OPTIC ASSEMBLIES HAVING CONNECTORS WITH RECESSED OPTICAL FIBERS

(75) Inventors: Radawan Hall, Granite Falls, NC (US); Micah C. Isenhour, Lincolnton, NC (US); Dennis M. Knecht, Hickory, NC (US); James P. Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 251 days.

(21) Appl. No.: 12/956,418

(22) Filed: Nov. 30, 2010

(65) Prior Publication Data

US 2011/0262076 A1 Oct. 27, 2011

Related U.S. Application Data

(60) Provisional application No. 61/328,142, filed on Apr. 26, 2010.

(51) Int. Cl.
*G02B 6/36* (2006.01)

(52) U.S. Cl.
USPC ............................................. 385/78; 385/92

(58) Field of Classification Search
USPC ...................................... 385/78, 92
See application file for complete search history.

(56) References Cited

U.S. PATENT DOCUMENTS

| | | | | |
|---|---|---|---|---|
| 4,390,237 A * | 6/1983 | Marazzi | ........................... | 385/84 |
| 6,074,100 A * | 6/2000 | Rowland et al. | ................ | 385/78 |
| 6,123,464 A * | 9/2000 | Murata et al. | ................... | 385/92 |
| 6,309,278 B1 | 10/2001 | Suzuki et al. | ................... | 451/41 |
| 6,669,375 B1 * | 12/2003 | Bonja et al. | ...................... | 385/73 |
| 2005/0094945 A1 * | 5/2005 | Danley et al. | ................... | 385/78 |
| 2007/0098328 A1 * | 5/2007 | Dean et al. | ....................... | 385/71 |
| 2007/0206904 A1 * | 9/2007 | Sezerman et al. | .............. | 385/78 |
| 2010/0046891 A1 * | 2/2010 | Sabo | ............................... | 385/74 |

FOREIGN PATENT DOCUMENTS

| | | | | |
|---|---|---|---|---|
| EP | 0848269 A1 * | 6/1998 | ............... | G02B 6/38 |
| EP | 1223445 A1 * | 7/2002 | ............... | G02B 6/38 |
| JP | 58 035506 A | 2/1983 | ............... | G02B 7/26 |
| JP | 58035506 A * | 3/1983 | ............... | G02B 7/26 |

OTHER PUBLICATIONS

European Search Report, Aug. 22, 2011, 6 pages.
EPO Communication, Aug. 28, 2012, Application No. 11163687.4-1524, pp. 1-7.

* cited by examiner

*Primary Examiner* — Charlie Peng
*Assistant Examiner* — Peter Radkowski

(57) ABSTRACT

Fiber optic assemblies including a plurality of optical fibers in a connector having a ferrule are disclosed. The ferrule has a front end face and a plurality of bores with the plurality of optical fibers being disposed within one of the respective plurality of bores. The fiber optic assemblies have the plurality of optical fibers recessed from the front end face of the ferrule by a suitable distance to inhibit physical contact of the plurality of optical fibers when mated with a complementary connection. Consequently, the fiber optic assemblies are suited for hundreds or thousands of connections and disconnections (i.e., mating cycles) with reduced susceptibility from damage and/or optical attenuation caused by dirt, debris and the like as expected with the consumer electronic/device environments.

20 Claims, 5 Drawing Sheets

FIBER OPTIC ASSEMBLIES HAVING CONNECTORS WITH RECESSED OPTICAL FIBERS

RELATED APPLICATIONS

The present application claims priority to U.S. Ser. No. 61/328,142 filed on Apr. 26, 2010 and entitled "FIBER OPTIC ASSEMBLIES HAVING CONNECTORS WITH RECESSED OPTICAL FIBERS", the contents of which are incorporated by reference.

BACKGROUND

The disclosure relates to fiber optic assemblies used for making repeated optical connections and disconnections. Specifically, the disclosure is directed to fiber optic assemblies having optical fibers that are recessed from an end face of a ferrule for allowing large numbers of connections and disconnections (i.e., matings) while providing suitable optical performance over its lifetime.

Benefits of optical fiber include extremely wide bandwidth and low noise operation. Because of these advantages, optical fiber is increasingly is used for a variety of applications such as transmission of broadband voice, video, and data transmission. Conventional fiber optic assemblies typically use a ferrule in the connector for holding and aligning the optical fibers during mating with another complementary connector. While it is advantageous for the craft to make optical connections that can be disconnected, reconfigured and/or replaced, the assemblies are not used in a fashion where they have relatively large numbers of mating cycles (i.e., disconnect and connect cycles). Instead, conventional optical connectors are typically designed to have low optical insertion loss.

In order to achieve low optical insertion loss conventional optical connections use and strive for physical contact between the optical fibers. In other words, the ends of the optical fibers actually physically contact, thereby providing a low-loss optical pathway by minizing/reducing gaps, reflections, and the like. As such, the optical fibers of conventional optical connectors' desire that the optical fiber is at, or past, the front end face of the ferrule for achieving physical contact and minimizing optical losses. Likewise, the conventional multi-fiber designs use physical contact since optical connection is much more difficult and complicated with multiple fibers while providing low-loss performance. In other words, multi-fiber optical connectors use physical contact over an array of fibers.

Of course, there are conventional fiber optic connector designs that do not use physical contact such as lens-based fiber optic connectors. Lens-based fiber optic connector designs generally use lens near the end of the optical fiber for beam expansion, thereby providing a larger area for detecting the optical signal. Like physical contact connectors there are drawbacks to the lens-based fiber optic connectors when experiencing large numbers of mating cycles. For instance, the lens-based fiber optic connectors have performance issues with contaminants such as dirt and debris. The assemblies disclosed herein solve the need in the art for a reliable, durable and rugged fiber optic connector with stable performance over a large number of mating cycles.

SUMMARY

Embodiments disclosed in the detailed description are directed to fiber optic assemblies having a plurality of optical fibers in a connector including a ferrule. The ferrule has a front end face and a plurality of bores with the plurality of optical fibers being disposed within one of the respective plurality of bores. The fiber optic assemblies are advantageous since the plurality of optical fibers are recessed from the front end face of the ferrule for inhibiting physical contact of the plurality of optical fibers when mated. Consequently, the fiber optic assemblies are suited for hundreds or thousands of connections and disconnections (i.e., mating cycles) with reduced susceptibility from damage and optical attenuation caused by dirt, debris and the like, thereby making the fiber optic assemblies suitable for devices requiring large numbers of matings such as consumer electronic devices. Moreover, the fiber optic assemblies do not allow physical contact between the fibers that can cause damage and/or debris for the same.

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION OF THE EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include fiber optic connectors and fiber optic assemblies such as cable having fiber optic connectors. The concepts disclosed herein are shown with respect to explanatory embodiments and may be used with suitable multi-fiber connectors on cables or consumer devices/electronics intended for a large number of mating cycles over their lifetime.

Figure 1:
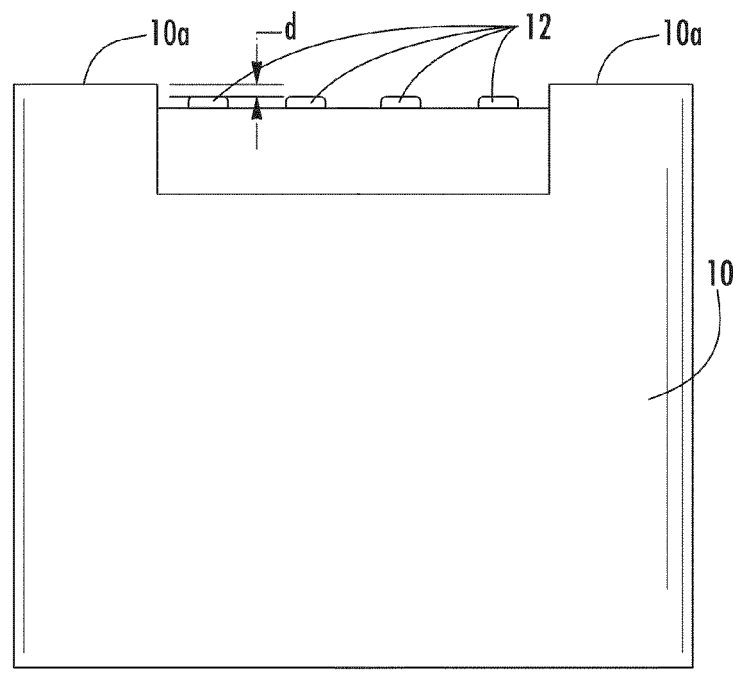
FIG. 1 is a top plan view showing a portion of an explanatory fiber optic assembly having a ferrule with optical fibers that are recessed from a front end face of the ferrule.

FIG. 1 depicts a portion of a representative fiber optic assembly having a plurality of waveguides such as optical fibers 12 and a connector having a ferrule 10. The ferrule 10 has a front end face 10a and a plurality of bores (not numbered) with each one of the plurality of optical fibers 12 being disposed within one of the plurality of bores. In this embodiment, the plurality of bores are located on a surface below the abutting front end face 10a of the ferrule and are recessed by a distance d as shown. Distance d is typically between about 1 and 25 microns for preserving optical performance such as 2 microns or greater, but any suitable value is possible so long as it meets optical performance and/or longevity requirements for large numbers of matings. Consequently, the plurality of optical fibers will not physically contact complimentary optical fibers when mated with a second complimentary connector. The lack of physical contact of the optical fibers is contrary to conventional assembly mating structures that do not use lens. The lack of physical contact is advantageous because it inhibits damage to the optical fibers from numerous matings such as numbering in the hundreds or thousands of matings, thereby providing an extended service life when exposed to a large number of mating cycles. Large number of mating cycles are not used for telecommunication applications; but, instead are suitable for consumer electronics/devices and the like where connections/disconnections occur on a regular basis in a "dirty" environment.

Figure 2:
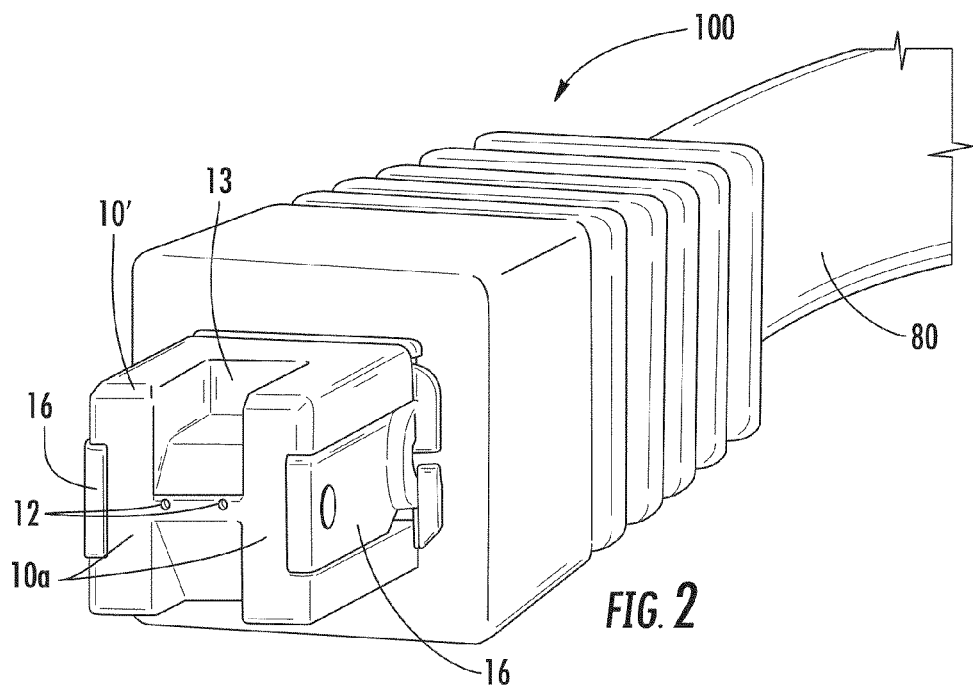
FIG. 2 is a perspective view of another explanatory fiber optic assembly having a ferrule with the optical fibers that are recessed from a front end face of the ferrule and that further includes electrical contacts.

The recessed distance d of optical fibers 12 from the front face of the ferrule may have any suitable value; however, it the distance is too large the optical performance suffers accordingly. By way of example, the plurality of optical fibers 12 of fiber optic assembly 100 may have recessed from front end face 10a of ferrule 10 by a distance d of between 1 and 10 microns. In other variations, the recessed distance d is between 1 micron and 5 microns and may be between two microns and three microns. The recessed distance d is measured from the abutting front end face 10a which may or may not be coplanar with the surface that includes the optical fiber bores depending on the type of ferrule the optical connector of the assembly employs. For instance, the front end face 10a of the ferrule may be defined by one or more bumpers of the ferrule and the bores of the ferrule are disposed on a different surface (FIG. 1) or the front end face of the ferrule may be coplanar with the bores of the ferrule (FIG. 2). The connectors used in assemblies disclosed herein use a ferrule for holding and aligning the optical fibers, but do not include a lens. Moreover, trimming and/or polishing of the waveguide or fiber ends may use conventional and/or laser-processing as known in the art.

Any suitable types, size, and/or construction of optical fiber 12 may be used in the assemblies disclosed herein. Additionally, optical fibers having relatively large cores may help preserve optical performance. By way of example, a large core optical fiber 12 may have a core that is 25 microns or greater. The assemblies disclosed herein preferably have at least two optical fibers, but may have more than two optical fibers.

FIG. 2 is a perspective view of another explanatory fiber optic assembly 100. Fiber optic assembly 100 has a hybrid connector that includes both optical and electrical connectivity attached to a fiber optic cable 80. In other words, the assembly has a connector that further includes at least one electrical contact along with the ferrule having optical fibers that are recessed from front end face 10a. Specifically, the assembly 100 includes a connector with a first electrical contact 16 and a second electrical contact 18. As shown, the first and second electrical contacts 16,18 are disposed on opposite sides of ferrule 10', but other arrangements are possible. Electrical contacts 16 are disposed in cavities within the respective sides of the ferrule 10' with a mounting feature (e.g., hole/aperture between electrical contact and ferrule) as shown. Additionally, ferrule 10' has at least one backdraft 13 so that the optical fibers may be laser processed. In other words, the backdraft inhibits the laser from contacting and damaging the ferrule of the connector. To achieve the recessed optical fibers disclosed herein, manufacturing may use laser processing using relevant concepts as disclosed in U.S. patent application Ser. No. 12/339,238 filed on Dec. 19, 2008 the contents of which are incorporated herein by reference.

The connectors of the assemblies may also include guide pins for aligning and mating cooperating ferrules of connectors. The guide pins provide alignment for mating optical connectors of assemblies; and, generally speaking aid in preserving optical performance from misalignment of optical fibers. In other words, the guide pins align mating ferrules.

Figure 3:
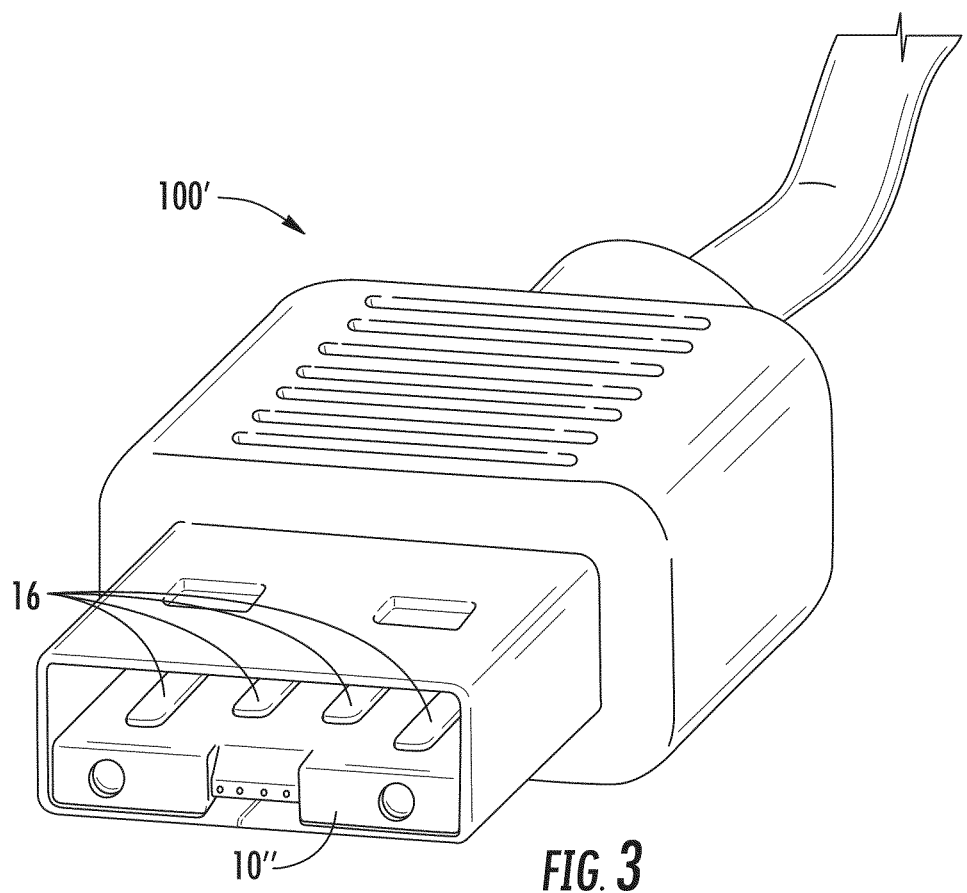
FIG. 3 shows an assembly having a connector with a USB footprint using the recessed concepts disclosed herein.

The concepts disclosed may be used with any suitable fiber optic connector. By way of example, FIG. 3 shows an assembly 100' having a connector with a USB footprint using a ferrule 10" with the recessed optical fiber concepts disclosed herein. Additionally, the assembly has a hybrid connector having both optical and electrical connectivity in a USB footprint. In other words, the hybrid connector includes electrical contacts 16. Besides different types of connectors, the concepts disclosed may be used with any suitable type of optical fibers such as single-mode, multi-mode, bend-insensitive, plastic optical fiber (POF), etc. Illustratively, optical fibers can have a relatively large core such as 25 microns or greater, but other smaller core sizes are possible such as used in single-mode optical fibers.

Assemblies having connectors with multi-fiber ferrules using recessed optical fibers are advantageous for applications where a large number of matings (i.e., connections and disconnections) are expected such as with consumer electronics/devices. The non-physical contact assemblies surprisingly provide acceptable insertion loss, durability and repeatable performance after numerous matings, and resistance to contamination (both ambient dust particles and/or contaminants) compared with other connector designs such as lens-based designs. Further, the endfaces of the optical fibers may include one or more coating for improving scratch-resistance, inhibiting debris adhesion and/or inhibit reflection such as an anti-reflection coating.

Figure 4A:
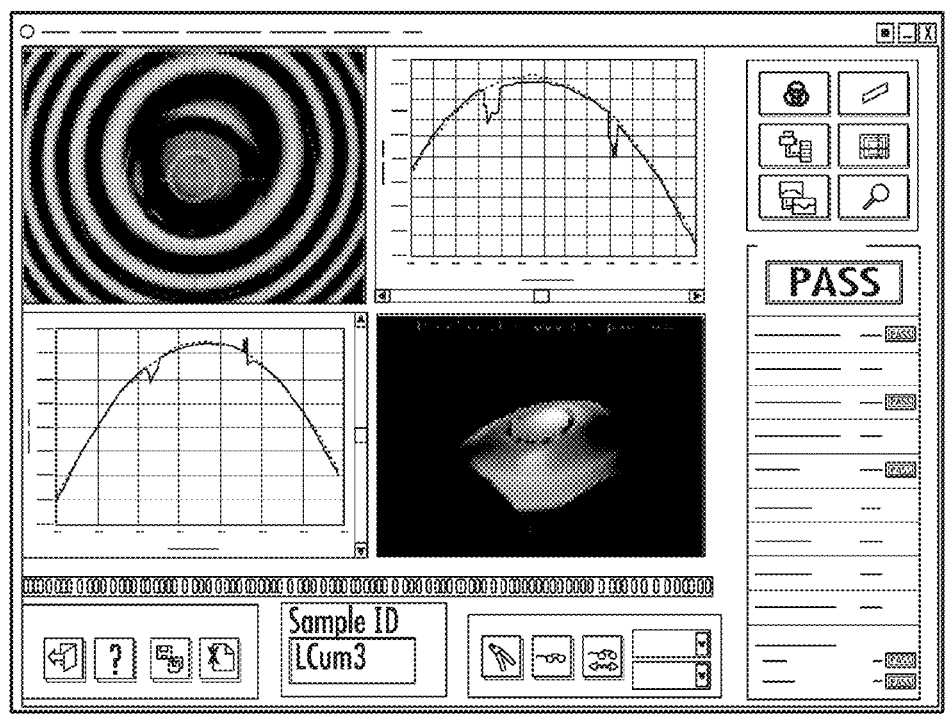
FIGS. 4A and 4B depicts measurements showing standard optical fiber and a recessed optical fiber for the purposes of comparison showing pass and fail conditions.
Figure 4B:
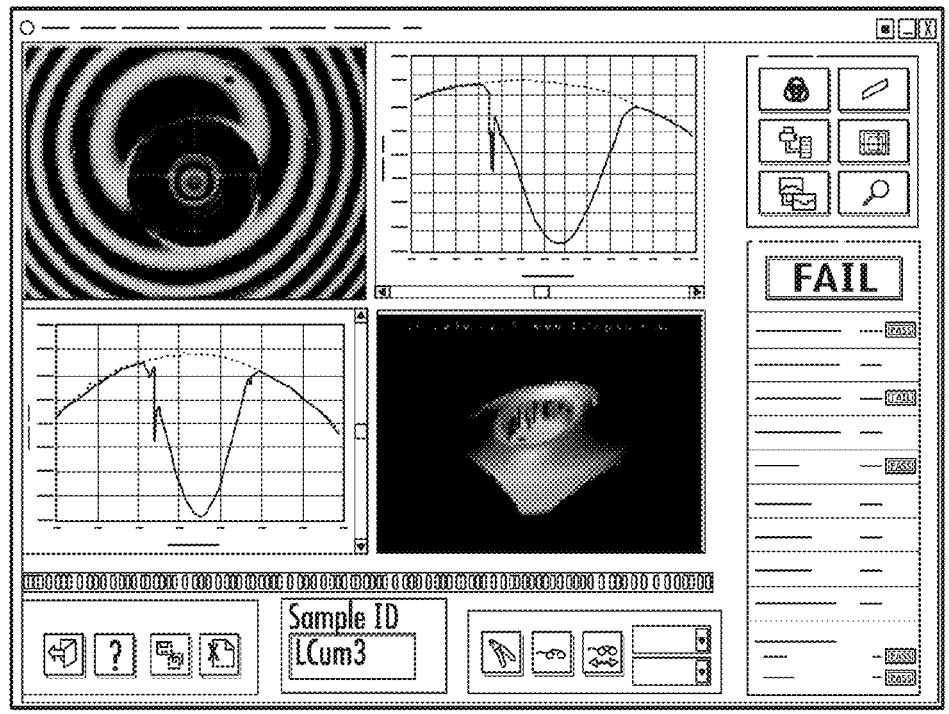

FIGS. 4A and 4B depict software showing standard physical contact ferrules during pass and fail conditions. Specifically, FIG. 4A depicts measurements of a standard LC ferrule having the optical fiber co-planar with the front end face of the ferrule (i.e., polished so that the fiber is even with the end face of the ferrule for physical contact) and a ferrule having a recessed (i.e., undercut) optical fiber that sits below the front end face of the ferrule. For a physical contact connector the recessed optical fiber in FIG. 4B does not pass inspection as shown by the graphic. In other words, ferrules having undercut optical fibers degrade optical performance and consequently are not desirable for telecommunication applications. However, using the recessed optical fibers in a multi-fiber ferrule and/or multi-fiber connectors expected to experience high-mating cycles such as with consumer electronics/devices provides stable optical performance over many mating cycles as disclosed herein.

Figure 5:
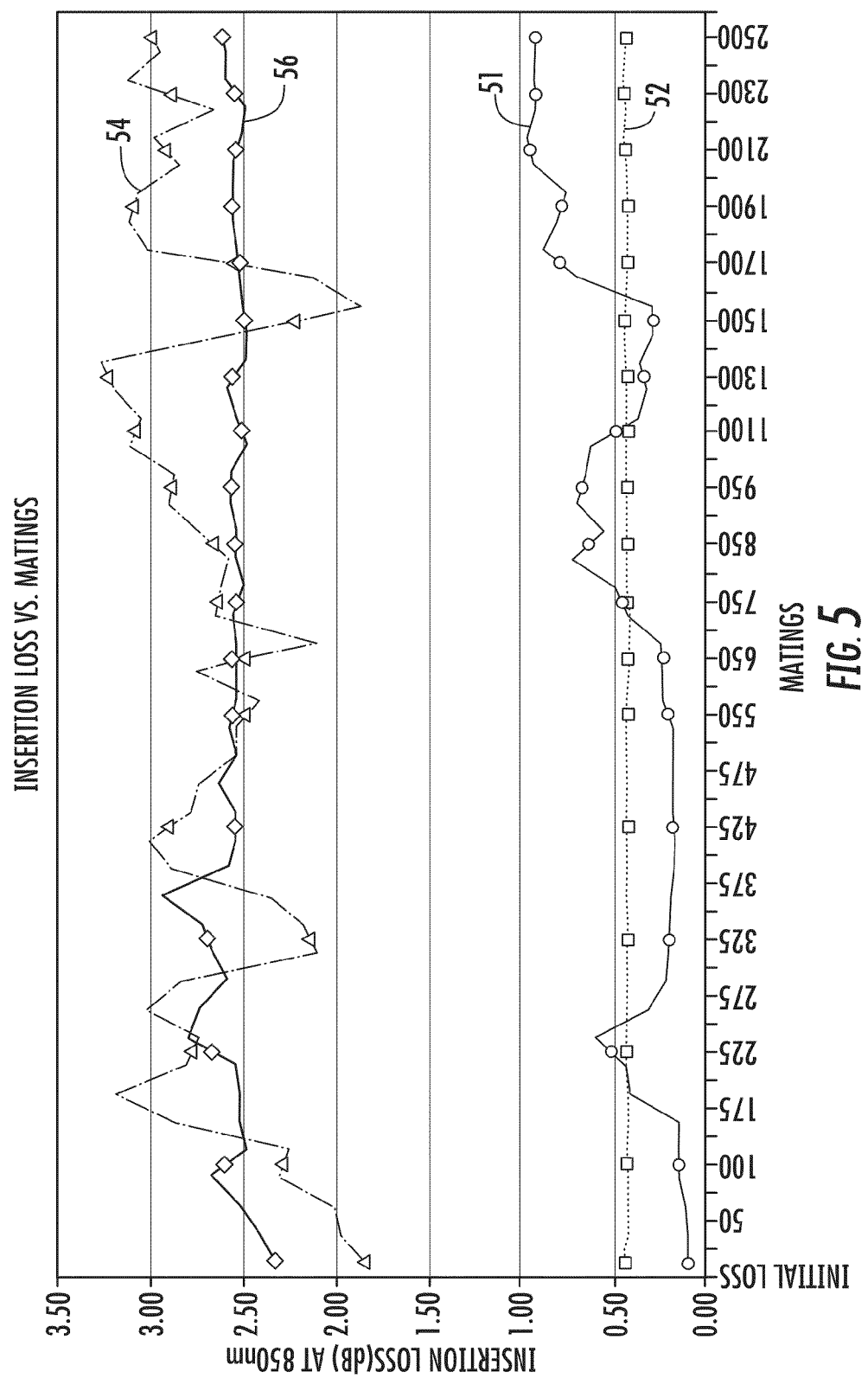
FIG. 5 is a graph showing the insertion loss for a variety of fiber optic assemblies as discussed herein.

Illustratively, testing of three different connector types having a large core optical fibers were subjected to an initial loss measurement and then measurements during the 2500 mating cycles for comparing insertion loss results as the number of mating cycles increase. FIG. 5 is a graph showing the insertion loss for a variety of fiber optic assemblies over the span of 2500 matings without cleaning as discussed herein. Specifically, the insertion loss (dB) at a reference wavelength of 850 nm was conducted for: (1) a ferrule assembly having a recessed optical fiber; (2) a standard ferrule assembly where the optical fiber is co-planar with the front end face of the ferrule to create physical contact; and (3) a lens-based connector assembly. The fiber optic assemblies tested included optical fibers having an 80 micron core; however, testing using other optical fibers are expected to show similar results due to debris created during mating that causes performance degradation. As shown by FIG. 5, the assembly with the recessed optical fibers represented by line 52 advantageously had a generally stable insertion loss over the span of 2500 matings. On the other hand, the standard assembly represented by line 51 had an insertion loss that generally increased as the number of matings increased, especially after 1500 matings. Specifically, the repeated matings of the standard assembly caused increased levels of insertion loss as the physical contact caused debris from the fiber coating to affect optical performance. The results from two different channels of a lens-based connector are also shown for comparison purposes and are represented by lines 54 and 56. As shown, the lens based solution had a relatively large insertion loss (i.e., on the order of 2 dB or greater) compared with the assembly using the recessed optical fiber (i.e., on the order of 0.5 dB). Thus, assemblies with recessed fibers performed better over large numbers of mating cycles compared with physical contact designs and lens-based designs.

Figure 6:
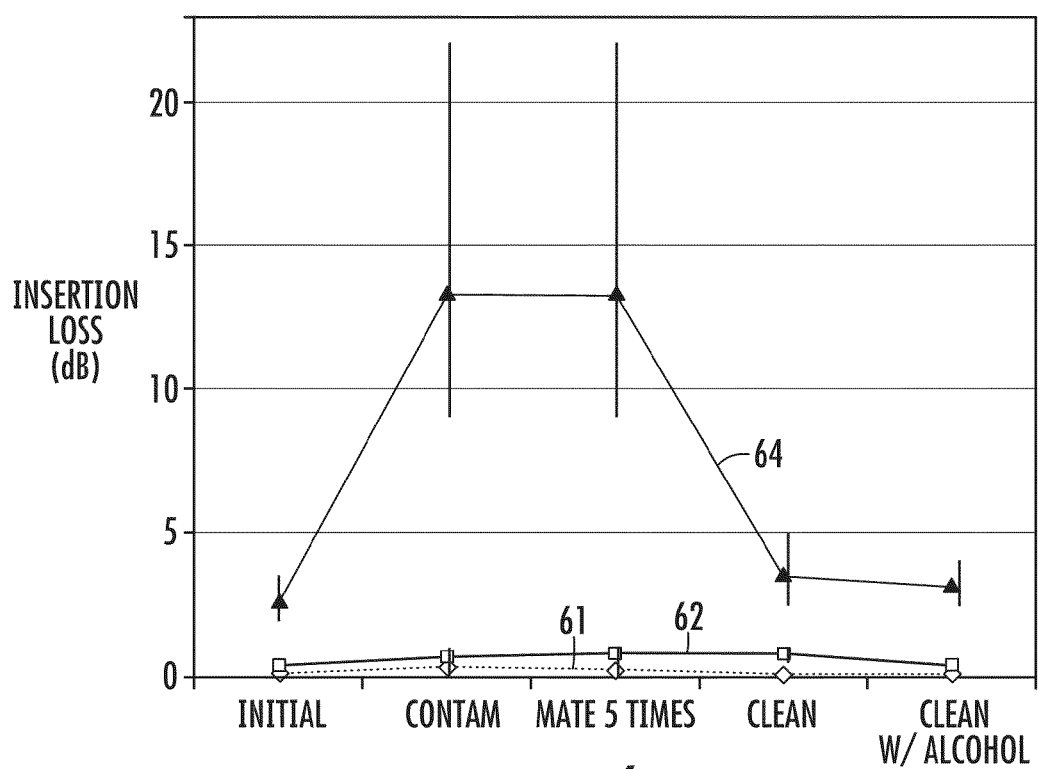
FIG. 6 is a graph showing the insertion loss when a contaminants are present.

Moreover, the results for the lens-based connectors are even worse when contaminates are present. By way of example, FIG. 6 shows testing for an oil/flour contaminants for the three connectors having ferrule assemblies as tested above in a variety of conditions. Specifically, the testing of the assemblies were initially tested "clean" before contamination as a baseline reference, after being contaminated with the oil/flour mixture, after five mating cycles without cleaning in between, after cleaning, and then after cleaning with alcohol. As shown, the oil/flour contamination caused high-levels of optical attenuation (i.e., on the order of 13 dBs) for the lens-based assembly as represented by line 64 until cleaning, which then lowered the loss. On the other hand, the assemblies using connectors with recessed (undercut) optical fibers as represented by line 62 performed much better when exposed to the contamination, but not as well as the assembly with the fiber at the surface of the ferrule as represented by line 61. Generally speaking, the contaminant greatly reduced the optical performance of the lens-based assembly, but provided suitable results for ferrule-based applications as shown by lines 61 and 62. Combining the results of FIG. 6 with the results of FIG. 5 reveals that ferrules having a plurality of undercut fibers perform well over a large number of mating cycles and/or contaminants, which are the expected environment for consumer electronic/device applications.

Also disclosed are methods of making fiber optic assemblies including the steps of providing a plurality of optical fibers and a ferrule for an optical fiber connector. The ferrule includes a plurality of bores and a front end face and securing the plurality of optical fibers respectively into one of the plurality of bores so that the optical fibers are recessed from the front end face. The method may include using a ferrule where the plurality of bores are located on the front end face of the ferrule and/or processing the plurality of optical fibers using conventional methods and/or with a laser as known in the art.

Therefore, it is to be understood that the embodiments are not to be limited to the specific embodiments disclosed and that modifications and other embodiments are intended to be included within the scope of the appended claims. It is intended that the embodiments cover the modifications and variations of this invention provided they come within the scope of the appended claims and their equivalents. Although specific terms are employed herein, they are used in a generic and descriptive sense only and not for purposes of limitation.

We claim:

1. A fiber optic assembly, comprising:
a plurality of optical fibers, wherein the plurality of optical fibers have a core that is 25 microns or greater;
a connector having a ferrule, the ferrule having a front end face and a plurality of bores, each one of the plurality of optical fibers being disposed within one of the plurality of bores, wherein the plurality of optical fibers are recessed from the front end face of the ferrule so that the plurality of optical fibers do not physically contact complimentary optical fibers when mated with a complimentary connector, wherein the front end face of the ferrule is defined by one or more bumpers of the ferrule and the plurality of optical fibers are recessed from the one or more bumpers of the front end face by a distance between one micron and five microns.

2. The fiber optic assembly of claim 1, wherein the plurality of bores are located on the front end face of the ferrule.

3. The fiber optic assembly of claim 1, wherein the plurality of optical fibers are recessed from the front end face by a distance of at least two microns.

4. The fiber optic assembly of claim 1, wherein the plurality of optical fibers are recessed from the front end face by a distance between two microns and three microns.

5. The fiber optic assembly of claim 1, wherein the connector includes at least one electrical connection.

6. The fiber optic assembly of claim 1, wherein the connector includes a first electrical contact and a second electrical contact.

7. The fiber optic assembly of claim 1, wherein the plurality of optical fibers have a core that is 80 microns.

8. The fiber optic assembly of claim 1, wherein the connector has a USB footprint.

9. A fiber optic assembly, comprising:
a plurality of optical fibers, wherein the plurality of optical fibers have a core that is 25 microns or greater;
a connector having a ferrule, the ferrule having a front end face having one or more bumpers and with a plurality of bores located at the front end face of the ferrule, each one of the plurality of optical fibers being disposed within one of the plurality of bores, wherein the plurality of optical fibers are recessed from the one or more bumpers of the front end face of the ferrule, wherein the connector has a USB footprint, wherein the plurality of optical fibers are recessed from the one or more bumpers of the front end face by a distance between two microns and three microns.

10. The fiber optic assembly of claim 9, wherein the plurality of optical fibers are recessed from the front end face by a distance between one micron and five microns.

11. The fiber optic assembly of claim 9, wherein the plurality of optical fibers are recessed from the front end face by a distance of at least two microns.

12. The fiber optic assembly of claim 9, wherein the connector includes at least one electrical connection.

13. The fiber optic assembly of claim 9, wherein the connector includes a first electrical contact and a second electrical contact.

14. The fiber optic assembly of claim 9, wherein the plurality of optical fibers have a core that is 80 microns.

15. A method of making a fiber optic assembly, comprising the steps of:
   providing a plurality of optical fibers, wherein the plurality of optical fibers have a core that is 25 microns or greater;
   providing a ferrule for an optical fiber connector, the ferrule having a plurality of bores and a front end face having one or more bumpers; and
   securing the plurality of optical fibers respectively into one of the plurality of bores so that the optical fibers are recessed from the one or more bumpers of the front end face, wherein the plurality of optical fibers are recessed from the front end face by a distance between one micron and five microns.

16. The method of claim 15, wherein the plurality of bores are located on the front end face of the ferrule.

17. The method of claim 15, further including the step of processing the plurality of optical fibers with a laser.

18. The method of claim 15, wherein the fiber optic assembly has a USB footprint.

19. The method of claim 15, wherein the plurality of optical fibers are secured to the respective plurality of the bores and then the plurality of optical fibers are processed with a laser.

20. The method of claim 15, the plurality of optical fibers being recessed from the front end face of the ferrule by a distance of at least two microns.

* * * * *